United States Patent [19]

Kawakami et al.

[11] Patent Number: 5,010,406
[45] Date of Patent: Apr. 23, 1991

[54] APPARATUS FOR RECEIVING CHARACTER MULTIPLEX BROADCASTING

[75] Inventors: Toshikatsu Kawakami, Mishima; Shin Fukuda, Hirakata; Hiroyasu Shinbo, Toyonaka; Toyoaki Unemura, itami; Ken Sakamoto, Takatsuki; Tomoji Kondo, Takatsuki, all of Japan

[73] Assignee: Matsushita Electric Industrial Co., Ltd., Osaka, Japan

[21] Appl. No.: 354,241

[22] Filed: May 19, 1989

[30] Foreign Application Priority Data

May 25, 1988 [JP] Japan .................. 63-127733

[51] Int. Cl.$^5$ .......................... H04N 7/087
[52] U.S. Cl. ........................ 358/147; 358/183
[58] Field of Search .......... 358/142, 146, 147, 183

[56] References Cited

U.S. PATENT DOCUMENTS

| 3,532,806 | 10/1970 | Wicklund | 358/183 |
| 4,228,433 | 10/1980 | Matsumoto | 358/183 |
| 4,891,705 | 1/1990 | Suzuki et al. | 358/183 |
| 4,954,882 | 9/1990 | Kamemoto | 358/22 |

FOREIGN PATENT DOCUMENTS 58-44871 3/1983 Japan .
61-27884 12/1986 Japan .
0277869 12/1987 Japan .

OTHER PUBLICATIONS

"Display Refresh Mechanism Employing Multisegmental Buffer"; Cummins et al.; IBM Technical Disclosure Bulletin; vol. 18, No. 10, Mar. 1976, pp. 3392-3396.

"Character Display System for a High Resolution CRT Display", Sonoda; IBM Technical Disclosure Bulletin; vol. 25, No. 7A; Dec. 1982, pp. 3175-3176.

Primary Examiner—John W. Shepperd
Assistant Examiner—Michael D. Parker
Attorney, Agent, or Firm—Stevens, Davis, Miller & Mosher

[57] ABSTRACT

A character multiplex broadcasting receiving apparatus is provided for reducing and displaying a plurality of character figure images including header information and text information. In the invention, to simultaneously display a plurality of character figure images, division signals are formed from a horizontal pulse, a vertical pulse, and a clock pulse (chrominance subcarrier frequency $f_{sc} \times 4$) to designate areas on the CRT. Either and animation image (television image) or a character image to display character figure information is designated for each divided picture plane and a plurality of character figure images are simultaneously displayed.

3 Claims, 4 Drawing Sheets

FIG. 3A
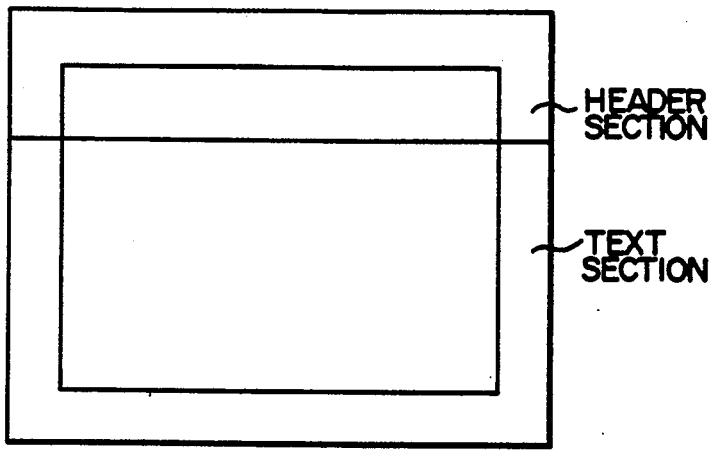
FIG. 3B
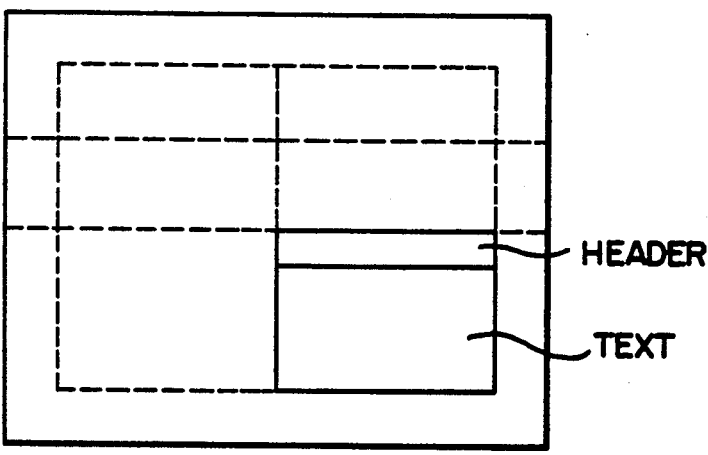
FIG. 3C

APPARATUS FOR RECEIVING CHARACTER MULTIPLEX BROADCASTING

BACKGROUND OF THE INVENTION

The present invention relates to an apparatus for receiving a character multiplex broadcast in which when a character image is reduced and divisionally displayed on a cathode ray tube (CRT), a superimposing control to decide whether the image displayed on the divided screen is a television image or a character image can be executed every divided screen, and both of the television image and the character image can be simultaneously mixedly displayed on the CRT.

In recent years, a new media of character broadcasting has been put into practical use and has become gradually widespread. Various kinds of additional functions are being examined to increase the use of character broadcasting.

FIG. 1 shows a schematic block diagram of a character multiplex receiving decoder (hereinafter, simply referred to as a decoder). In the diagram, reference numeral 1 denotes a central processing unit (CPU) to process various kinds of data of the decoder. Reference numeral 2 denotes a read only memory (ROM) in which a program to execute the processing procedure in the CPU 1 is stored; 3 indicates a random access memory (RAM) for working of the CPU 1; 4 an extracting section for extracting a character signal from a video signal and supplying the same to the CPU 1; 5 a system control section to generate various kinds of control signals which are necessary to control each block; 6 a display control section for storing the received character signal into a video RAM 7 or for reading out the character signal from the video RAM 7 and outputting the same to a display terminal; and 8 a Kanji (Chinese character) ROM to store a font (pattern) of a character which was encoded and designated in the character signal. The code encoded in accordance with a predetermined code system (for instance, Japanese Industrial Standard (JIS)) is supplied from the CPU 1 and added as an address into the Kanji ROM 8 and a pattern output corresponding to the code is read out of the Kanji ROM 8 and written into the video RAM 7. By reading out the pattern output from the video RAM 7 and outputting it to the CRT, the character is displayed on the CRT screen.

FIG. 2 is a block diagram of a decoding section as a part of the display control section 6 in FIG. 1.

In the diagram, reference numeral 9 denotes a selector to switch and output one of a raster information signal to designate the background color of the whole screen and a character figure information signal when a character figure picture plane is displayed on the CRT. Reference numeral 10 denotes a detecting circuit to detect the presence or absence of the character figure information signal to generate a switching signal which is necessary when the selector 9 performs the switching operation; 11 indicates a detecting circuit to obtain a YM signal which is necessary to execute the superimposing display; and 12 a detecting circuit to similarly obtain a YS signal. Reference numeral 13 denotes a register to output an indication signal to indicate whether a character figure image to be displayed is an image to be superimposed or not on the basis of the control of the CPU 1. Reference numerals 14 and 15 denote AND gates which are opened only when the indication signal to indicate the superimposing display was input from the register 13.

The operation of the display control section of the above-mentioned character multiplex receiving decoder will now be described hereinbelow.

In the character multiplex broadcasting, in general, sixteen colors comprising eight colors each with two gradations can be displayed. Therefore, all of the colors can be designated by 4-bit data and the following table shows the relationship among the 4-bit data and the display colors.

| | Ri | B | G | R | color |
|---|---|---|---|---|---|
| 0 | 0 | 0 | 0 | 0 | black |
| 1 | 0 | 0 | 0 | 1 | red |
| 2 | 0 | 0 | 1 | 0 | green |
| 3 | 0 | 0 | 1 | 1 | yellow |
| 4 | 0 | 1 | 0 | 0 | blue |
| 5 | 0 | 1 | 0 | 1 | pink |
| 6 | 0 | 1 | 1 | 0 | light blue |
| 7 | 0 | 1 | 1 | 1 | white |
| 8 | 1 | 0 | 0 | 0 | transparent |
| 9 | 1 | 0 | 0 | 1 | ½ red |
| 10 | 1 | 0 | 1 | 0 | ½ green |
| 11 | 1 | 0 | 1 | 1 | ½ yellow |
| 12 | 1 | 1 | 0 | 0 | ½ blue |
| 13 | 1 | 1 | 0 | 1 | ½ pink |
| 14 | 1 | 1 | 1 | 0 | ½ light blue |
| 15 | 1 | 1 | 1 | 1 | ½ white |

In the above table, the color is set in a manner such that when the color data is "8" or more, that is, when the bit of Ri is set to "1", the luminance of the color which is expressed by the other three bits is reduced into the half. Although the color data "8" denotes black of ½, such a color does not actually exist; therefore, the transparent color is set in such a case. In other words, if the information indicative of color data "8" exists in the character figure information signal, the color at such a position is displayed as a raster color. Namely, the character/figure is displayed as a transparent image. On the other hand, in the superimposing display mode, a television signal is displayed in place of the raster color display. Therefore, in the superimposing display mode, by designating "8" for both of the raster color and character background color (writing "8" into the video RAM), the superimposed display of both of the character and the television signal can be executed. The YS signal is used to realize such an operation control. Further, since ½ white (gray color) in the superimposed mode is difficult to see, the YM signal is used to execute an operation control so as to reduce the luminance level of the television image only in the superimposing display mode.

From the character figure information signal, either one of the character figure information signal and the raster information signal is selected by the selector 9 on the basis of a detection output signal of the detecting circuit 10, so that the final R, G, and B signals are derived. On the other hand, in the superimposing display mode, the superimposing display mode is designated to the register 13 by the CPU 1 and the gates 14 and 15 are opened, thereby obtaining the YM and YS signals.

Although not shown, the R, G, B, and Ri signals are converted into analog signals by simple D/A converters and are synthesized with the television signal together with the YM and YS signals.

The operation of the character multiplex receiving decoder constructed as mentioned above will now be briefly explained hereinbelow.

If the figure information in the character signal extracted from the video signal by the character signal extracting section 4 has been subjected to compression or the like by the process of the CPU 1, the expanding process is executed and, thereafter, the expanded figure information is input to the display control section 6. Or, in the case of the encoded character information, the Kanji ROM 8 is accessed in accordance with the code of such character information and the pattern read out of the ROM 8 is input to the display control section 6. The display control section 6 stores the figure information or pattern into the video RAM 7 in accordance with the input. The display control section 6 simultaneously reads out the display data from the video RAM 7 and provides an output of the R, G, and B signals through a decoding section in FIG. 2.

In addition to the ordinary character broadcasting receiving and displaying operations as mentioned above, as an additional function, as shown in FIG. 3B, there is considered what is called a picture-in-picture mode in which the display area of the character picture plane data is reduced and is displayed by synthesizing onto the ordinary television screen. For instance, the screen in which the ordinary character picture plane area comprises 248 dots in the lateral direction and 204 lines in the vertical direction is reduced into the picture plane area comprising 124 dots × 102 lines whose size is ¼ of the ordinary screen and the display is executed on the reduced area. If the ordinary television picture plane data is displayed as the main data and the character picture plane data is displayed as a size of ¼ at the corner of the main television picture plane area, both of them can be simultaneously seen. On the other hand, if character picture plane data which the user wants to see in detail is input, such data can be soon exchanged and displayed in the main picture plane area in place of the main television picture plane data. Further, as shown in FIG. 3C, the character picture plane data of four picture planes can be also simultaneously displayed. In such a case, the amount of information able to be displayed is increased, thus improving the overall usefulness of the system.

In general, in the case of displaying the character picture plane data on the CRT, a display memory is assigned so as to cover the whole display area. Since the character picture plane data in which the display area is reduced uses a part of the display memory, each time the reduced display is executed in a part of the television image, the rewriting operation must be performed so as to generate the YS signal from the display memory in the other area. Unfortunately, the program required to execute the above data processing is complex and development costs are significant.

On the other hand, in the case of simultaneously displaying four reduced picture planes, if the superimposing display mode is designated for either one of them, a similar problem occurs.

SUMMARY OF THE INVENTION

It is an object of the present invention to provide a character multiplex broadcasting receiving apparatus with a data simplified processing program for reducing and displaying received character picture plane data.

Another object of the invention is to provide a receiving apparatus with a simplified program which is used to simultaneously display character picture plane data of a plurality of picture planes which were data processed so as to reduce the display areas and to display any of the picture planes in the superimposed display mode.

To accomplish the above objects, a character multiplex broadcasting receiving apparatus of the invention is constructed in a manner such that when the reduced character image is displayed in a part of a television image, if character image data which is displayed in an area other than the area whose display position is designated is input, a YS signal is automatically generated, and on the other hand, when the superimposed display mode is designated for either one of a plurality of picture planes, a control signal to perform the transparent display as a raster information signal is output from a control signal register corresponding to each picture plane.

With the above construction of the invention, even if the additional function for the reduction display is provided, the control similar to the ordinary character broadcasting display can be executed on a divided picture plane unit basis. The time and cost of development time of control program software and the data processing burden can be reduced.

BRIEF DESCRIPTION OF THE DRAWINGS

FIGS. 3A to 3C are front views of picture planes showing display examples in the case of the picture-in-picture display mode and the multi-display mode;

DESCRIPTION OF THE PREFERRED EMBODIMENT

Figure 4:
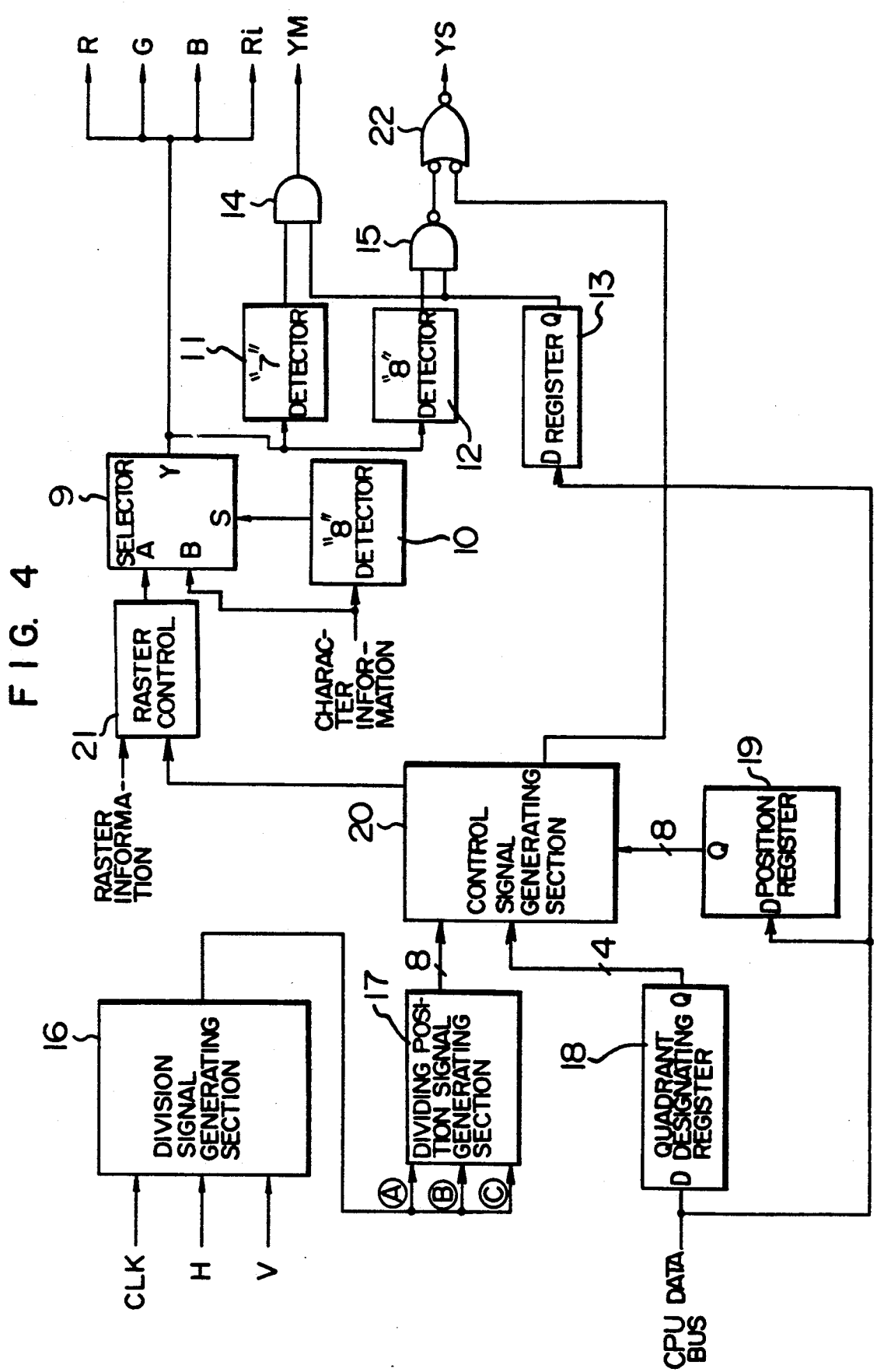
FIG. 4 is a schematic block diagram of a character multiplex broadcasting receiving apparatus in an embodiment of the present invention.

An embodiment of the present invention will be described hereinbelow with reference to the drawings. FIG. 4 is a block diagram of an RGB decoding section in a character multiplex broadcasting receiving apparatus in an embodiment of the invention.

Figure 1:
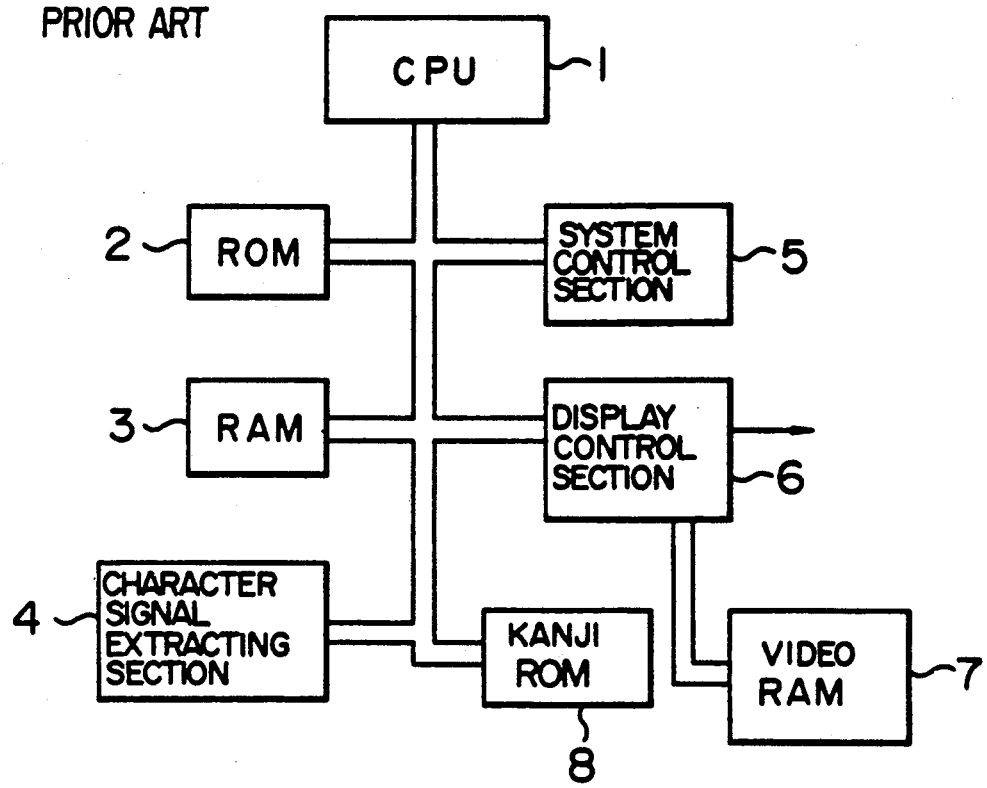
FIG. 1 is a block diagram of a conventional character multiplex broadcasting receiving apparatus.
Figure 2:
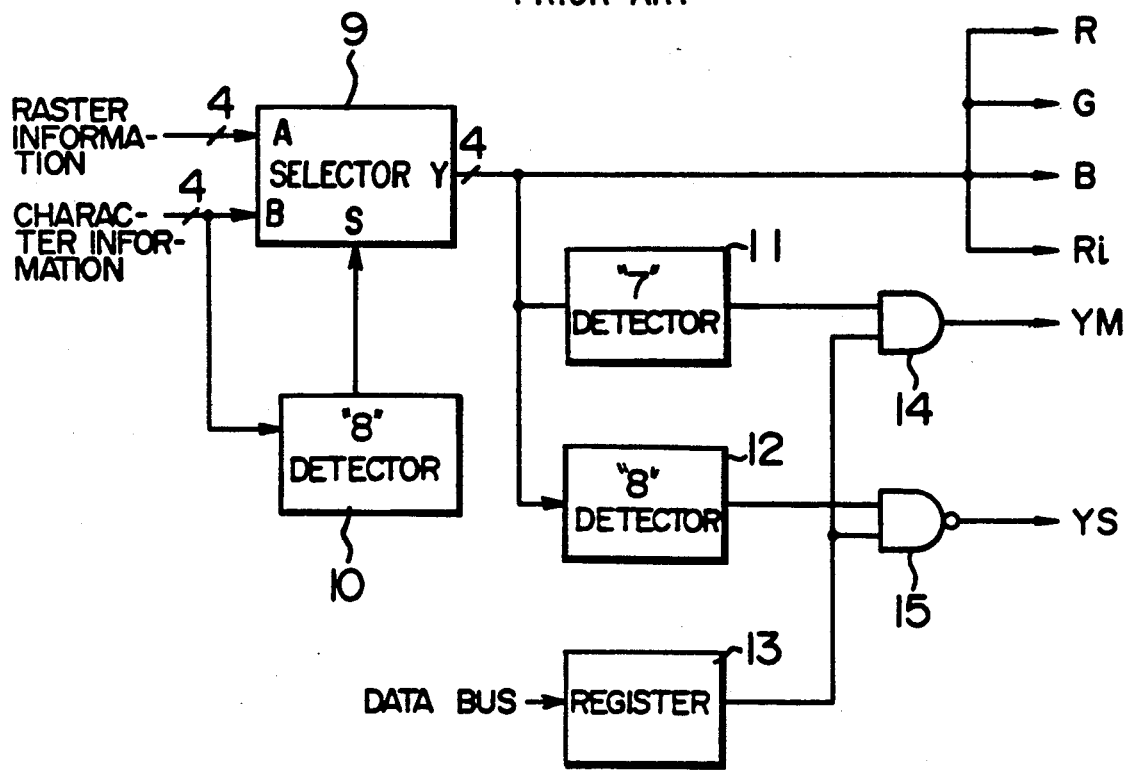
FIG. 2 is a block diagram of RGB decoding section as a part of a display control section in FIG. 1.

In the diagram, reference numerals 9 to 15 denote the same parts and components as those shown in FIG. 2. Reference numeral 16 indicates a division signal generating section for receiving a horizontal signal H, a vertical signal V, and a clock signal CLK obtained by frequency dividing a chrominance subcarrier frequency signal and for generating division signals Ⓐ Ⓑ and Ⓒ which are necessary to perform the reduction display. Reference numeral 17 denotes a dividing position signal generating section to obtain a dividing position designation signal corresponding to each display position in FIG. 3C from the division signals obtained from the division signal generating section 16. Reference numeral 18 denotes a quadrant designating register to designate a display position (quadrant) in the case of performing the picture-in-picture display; 19 indicates a super-position designating register which is necessary in the multi-display mode and generates a control signal so that the superimposing display mode can be designated in correspondence to each display block shown in FIG. 3C; and 20 represents a control signal generating section for receiving the above various kinds of designation and control signals and for generating a superimpose designation signal in correspondence to each dividing position.

Reference numeral 21 denotes a raster control circuit to forcedly set the raster information signal to the data corresponding to "8" in the above table by the superimpose designation signal obtained by the control signal generating section 20. Reference numeral 22 indicates an OR gate to similarly forcedly switch the YS signal to the television image signal.

The operation of the RGB decoder constructed as mentioned above will now be described hereinbelow.

The ordinary character broadcast displaying operation is similar to that in the conventional apparatus. The multi-display mode will be first explained hereinbelow.

In the multi-screen display mode as shown in FIG. 3C, the picture plane is not always limited to the character picture plane but there are also a title service and a superimposing display. In the case where they are designated, the apparatus must execute those instructions. In the multi-screen display mode, it is arbitrarily necessary to control the character picture plane (text) display or the superimposing display.

Figure 5:
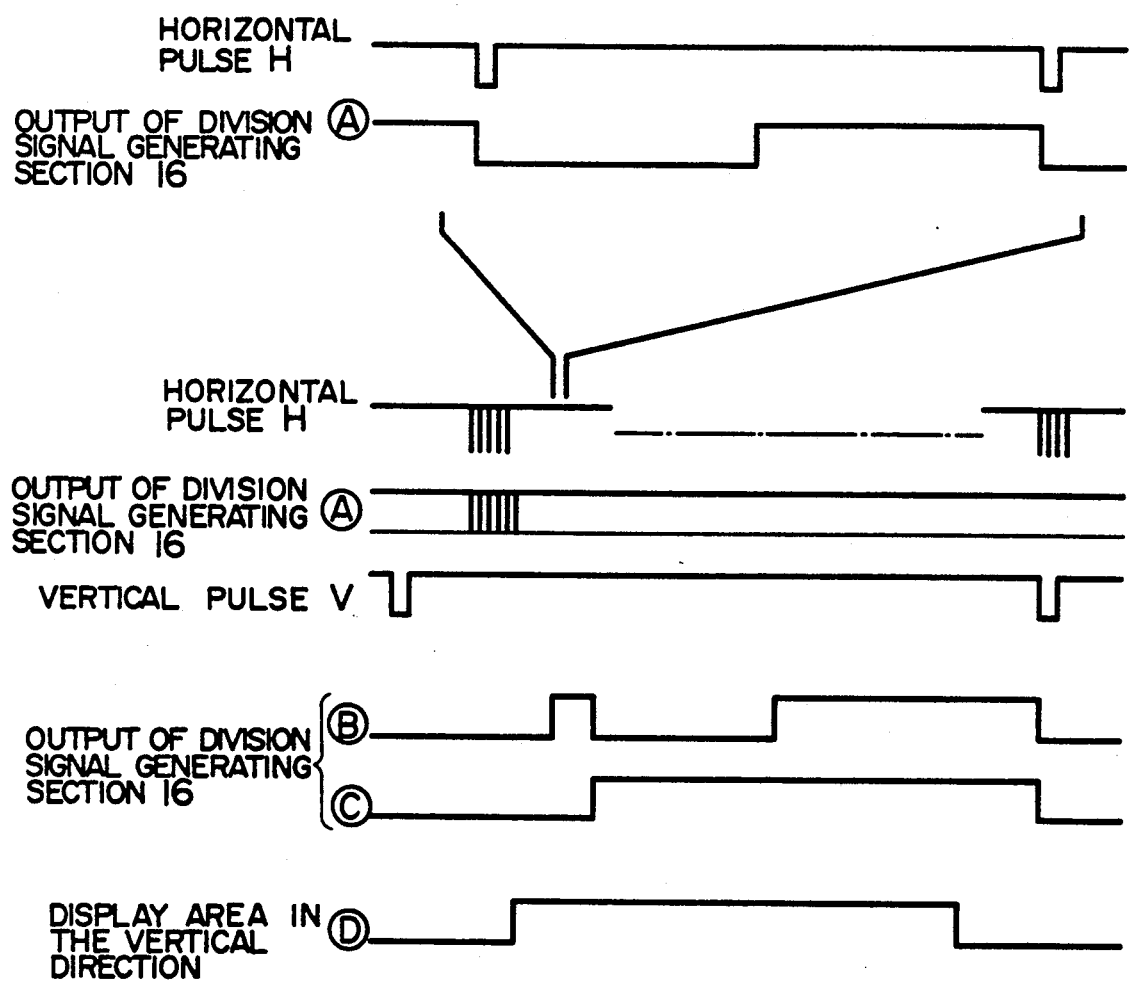
FIG. 5 is a timing chart of signals which are obtained from a division signal generating section in FIG. 4.

The division signal generating section 16 obtains signals as shown in FIG. 5 from the CLK (display clock or the like), H (horizontal pulse), and V (vertical pulse). Ⓐ denotes the signal which has the same period as the horizontal pulse H and is the division signal to designate either the left half (0) or the right half (1) on the display screen. That is, either the display areas of "1", "3", "5", and "7" or the display areas of "2", "4", "6", and "8" in FIG. 3C are designated. Ⓑ indicates the signal synchronized with the vertical pulse V and similarly designates either the display areas (0) of "1", "2", "5", and "6" or the display areas (1) of "3", "4", "7", and "8". Ⓒ likewise designates either the header sections (0) of "1", "2", "3", and "4" or the text sections (1) of "5", "6", "7", and "8". The signal Ⓓ in FIG. 5 denotes a display area in the vertical direction.

The dividing position signal generating section 17 generates signals corresponding to the dividing positions indicated by the division signals Ⓐ Ⓑ and Ⓒ. Those signals are indicated by the super-position designating register 19 to generate a control signal in correspondence to each divided screen to indicate the superimposing position. If 1 (header 1) and 5 (text 1) show the superimposing display, the signal corresponding thereto is generated. The dividing position signal generated from the dividing position signal generating section 17 is controlled by the control signal generating section 20. A super-switching signal is generated at only the indicated dividing position.

To set the superimposing display mode, it is fundamentally sufficient to set the raster information signal to the color data "8". Therefore, the output of the super-control signal generating section 20 is input to the raster control section 21 and the raster information signal is forcedly set to the data value "8". Thus, the raster is set into the superimposing mode at only the designated dividing position.

However, in such a case, since the above circuit is commonly used together with the ordinary circuit, it is necessary that the text/super switching register 13 is set into the superimposing display mode.

The operation in the picture-in-picture display mode will now be described. In the above case, the super-position designating register 19 is not used but the quadrant designating register 18 is used. The picture-in-picture system intends to reduce and display a character picture plane at the designated quadrant position on the television image. It will be inconvenient if the character picture plane is displayed at a position other than the designated position. In the picture-in-picture display mode, the image data to be reduced and displayed is stored in the memory which is commonly used to store the ordinary character picture plane data. Therefore, according to the conventional method, it is necessary to erase the contents of memory other than the designated quadrant. However, the data processes or the like in such a case are troublesome. Therefore, the quadrant designating register 18 is used and the superimposing signal is generated at the divided screen position other than the designated quadrant. The superimposing signal is transmitted through the OR gate 22 and the YS signal is forcedly set to "0". Due to this, even if any character image exists in the quadrant other than the designated quadrant, it is not displayed and there is no need to erase the content of the memory. It is also possible to construct the detecting circuits 10 and 12 in a manner such that the input data is inverted by an inverter or the like and "0" is detected. On the other hand, it is also obviously possible to commonly use the registers 13 and 18 or the like.

As described above, according to the present invention, in the case of performing the reduction display in the multi-display or picture-in-picture display, the processes to erase and rewrite the memory content can be omitted. If reduction data is preliminarily prepared, they can be instantaneously exchanged or the like and the burden on the program software processes can be lightened.

We claim:

1. A character multiplex broadcasting receiving apparatus comprising:
   means for receiving, storing, and displaying character signals representing character images which were multiplexed for a vertical blanking period of a television signal including information representing a television image;
   division signal generating means, receiving a horizontal pulse, a vertical pulse and a clock signal, for generating division signals, said division signals being employed in the reduction of a picture plane to be received and displayed and in the simultaneous display of images in a plurality of divided picture planes in a display screen based on said horizontal pulse, said vertical pulse, and said clock signal; and
   selection signal generating means for selecting either said television image or one of said character images for each of said divided picture planes.

2. An apparatus according to claim 1, further comprising means for indicating a display position on said picture screen when displaying a reduced picture plane in a part of said television image, and means for causing an area of said picture screen other than the designated display position to display said television image.

3. A character multiplex broadcasting receiving apparatus for receiving character signals representing character images which were multiplexed for a vertical blanking period of a television signal including information representing a television image and for simultaneously displaying images in a plurality of divided picture planes on a display screen of a display means, said displayed screen being divided into a header portion and a text portion, said apparatus comprising:
- a division signal generating section for receiving a horizontal pulse and a vertical pulse and for generating a first division signal to designate one of two areas obtained by dividing said display screen into two areas in the horizontal direction on the basis of the horizontal pulse, a second division signal to designate one of two areas obtained by dividing said header portion and said text portion into two areas in the vertical direction on the basis of the vertical pulse, and a third division signal to designate one of the header portion and the text portion on the basis of the horizontal and vertical pulses;
- a dividing position signal generating section for receiving said first and third division signals and for generating a dividing position signal indicative of a dividing display position on the display screen of said display means;
- a superimposing position designating section for generating a first control signal to designate whether a display mode is a superimposing display mode or not in correspondence to the dividing position signal indicative of the dividing display position;
- a control signal generating section for receiving said dividing position signal and said first control signal and for generating a superimposing switching signal when the superimposing display is designated by the first control signal and the dividing display position is designated by said dividing position signal;
- a raster control section for receiving an output raster information signal and said superimposing switching signal and for setting the raster information signal to a special value;
- a quadrant designating section for generating a second control signal such that a character image is not displayed in an area other than said designated display position on the basis of an input data signal to designate a picture-in-picture display position, for supplying said second control signal to said control signal generating section, and for generating another control signal to designate a superimposing display mode for an area of said display screen other than the designated display position; and
- an output switching section for detecting the presence or absence of an input character figure information signal and for outputting either one of the character figure information signal and the output signal of said raster control section.

* * * * *